(12) United States Patent
Bouwers et al.

(10) Patent No.: US 8,628,034 B2
(45) Date of Patent: Jan. 14, 2014

(54) BELT TENSIONING APPARATUS

(75) Inventors: John T. Bouwers, Pella, IA (US); Justin J. Humpal, Monroe, IA (US)

(73) Assignee: Vermeer Manufacturing Company, Pella, IA (US)

( * ) Notice: Subject to any disclaimer, the term of this patent is extended or adjusted under 35 U.S.C. 154(b) by 713 days.

(21) Appl. No.: 12/599,646

(22) PCT Filed: May 1, 2008

(86) PCT No.: PCT/US2008/062202
§ 371 (c)(1),
(2), (4) Date: Nov. 23, 2010

(87) PCT Pub. No.: WO2008/140951
PCT Pub. Date: Nov. 20, 2008

(65) Prior Publication Data
US 2011/0073692 A1    Mar. 31, 2011

Related U.S. Application Data

(60) Provisional application No. 60/928,861, filed on May 10, 2007.

(51) Int. Cl.
*B02C 18/24* (2006.01)

(52) U.S. Cl.
USPC .................................. 241/101.2; 241/225

(58) Field of Classification Search
USPC ........ 241/101.2, 225; 474/101, 109, 117, 118
See application file for complete search history.

(56) References Cited

U.S. PATENT DOCUMENTS

| 2,386,071 A | 10/1945 | Stephenson |
| 3,819,121 A | 6/1974 | Rogers |
| 4,144,772 A | 3/1979 | Brackin et al. |
| 6,478,701 B1 | 11/2002 | Yasuhara et al. |
| 2006/0172833 A1 | 8/2006 | Kitzmiller |

FOREIGN PATENT DOCUMENTS

| DE | 198 81 945 B4 | 1/2000 |
| GB | 1166256 | 10/1969 |

*Primary Examiner* — Mark Rosenbaum
(74) *Attorney, Agent, or Firm* — Merchant & Gould PC

(57) ABSTRACT

A belt tensioning system configured to more effectively maintain the proper tension in a belt that can be engaged and disengaged. Proper tension in the belt is maintained even if the belt stretches or contracts by including a spring biased member between a tension wheel and a pivot frame. The spring member is preloaded such that when the belt stretches the tension wheel is biased against the belt by the force of the spring. Also, by selectively engaging the tension system one can avoid overloading the engine without the need to incorporate a clutch.

13 Claims, 5 Drawing Sheets

BELT TENSIONING APPARATUS

This application is a National Stage Application of PCT/US2008/062202, filed May 1, 2008, in the name of Vermeer Manufacturing Company, a U.S. national corporation, applicant for the designation of all countries except the US, and John T. Bouwers and Justin J. Humpal, citizens of the U.S., applicants for the designation of the US only, and claims priority to U.S. Provisional Patent Application Ser. No. 60/928,861, filed May 10, 2007, and which applications are incorporated herein by reference. To the extent appropriate, a claim of priority is made to each of the above disclosed applications.

FIELD OF THE INVENTION

The present invention relates generally to a belt tensioning apparatus.

BACKGROUND OF THE INVENTION

Belt tension systems are found in many different types of machinery including, for example, chippers and grinders. Chippers are used to reduce branches, trees, brush, and other bulk wood products into small chips. A chipper typically includes a feed system for controlling the feed rate of wood products into the chipper, a chipping mechanism, a drive system for powering the feed system and the chipping mechanism, and a discharge chute.

The chipping mechanism is commonly a large drum that includes blades thereon which is driven by a belt. The belt rotates the drum, enabling the drum to grind, flail, cut, or otherwise reduce the material fed into the chipper into small chips. The proper tension in the belt between the motor and the drum can be difficult to maintain as the belts tend to stretch and contract over time or even during use. Accordingly, there is a need in the art for an improved belt tension system.

Accelerating chipper drums and other cutting tools from a stopped position to maximum speed can be a challenge because the drums and other cutting/grinding tools are relatively large and heavy. If the belt is fully engaged between the output shaft and the drum during start up, the engine can be overloaded. To avoid overloading the engine in the start up process, typically a clutch is used to interface between the engine and the wheel that drives the belt. The clutch typically mounts adjacent the output shaft of the engine which is typically perpendicular to the length of the chipper or grinder frame. Accordingly, the inclusion of the clutch constrains how narrow the machine can be constructed. Also, since the clutch mechanism is lighter than the engine, the inclusion of the clutch typically undesirably shifts the center of gravity of the machine off to one side of the frame. A belt tension arrangement that could eliminate the need for a clutch is desirable.

SUMMARY OF THE INVENTION

The present disclosure relates to a belt tensioning system that is configured to more effectively maintain the proper tension in the belt that is driven by the motor to drive a cutting/grinding tool. The system of the present disclosure is configured so that the tension in the belt can be maintained even if the belt stretches or contracts. The present disclosure also relates to a belt tension system and method of starting the drum rotating that eliminates the need for a clutch.

DETAILED DESCRIPTION OF THE PREFERRED EMBODIMENT

Figure 1:
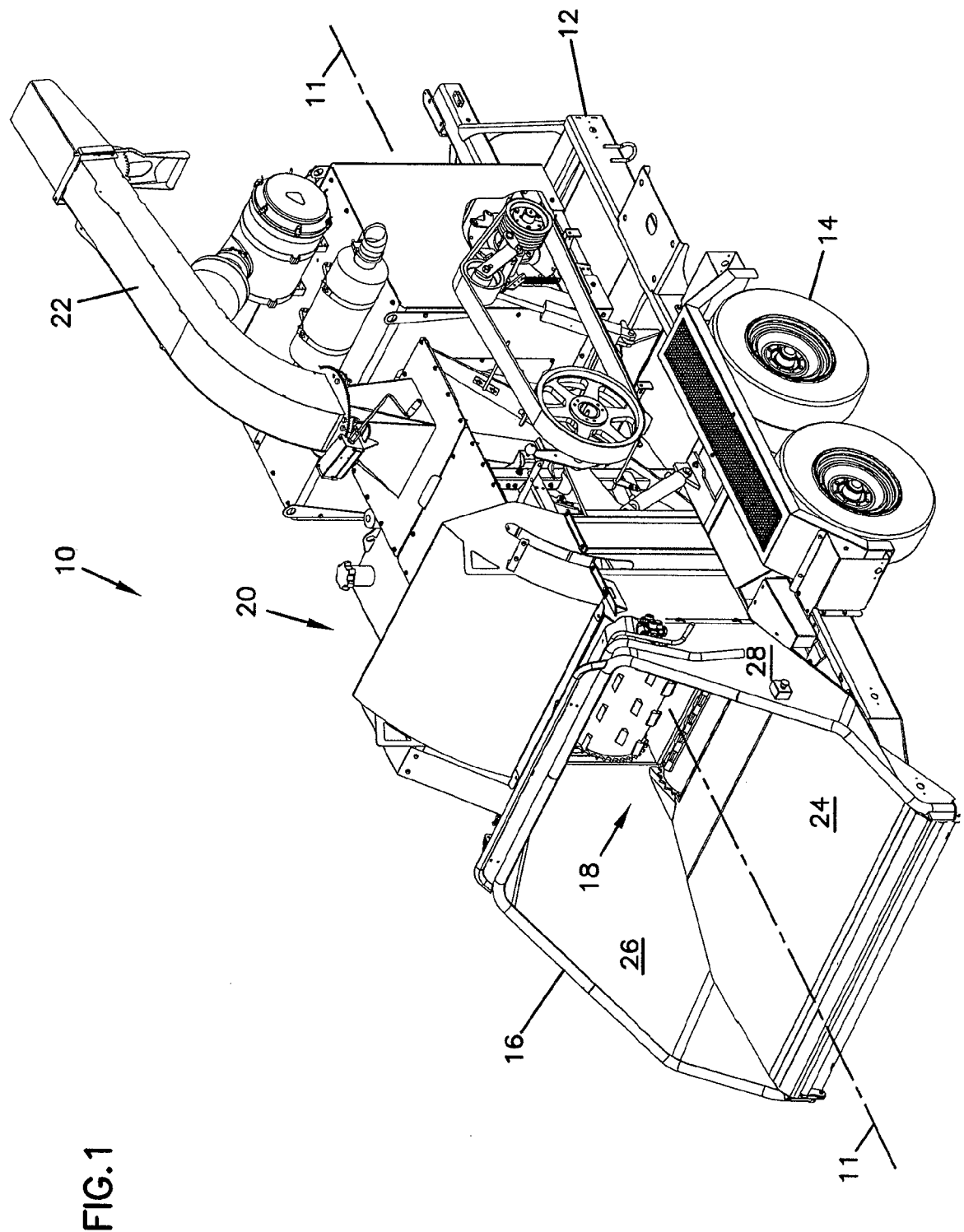
FIG. 1 is a perspective view of a chipper according to the principles of the present invention with portions of the engine and drum housing removed.

Referring to FIG. 1 the tensioning assembly 40 is shown on a chipper. In the depicted embodiment the chipper 10 is mounted to a frame 12 (chassis) that rests on wheels 14, which enable the chipper 10 to be conveniently moved. The depicted chipper 10 includes a feed chute 16, which is also commonly referred to as a feed table. The feed chute 16 can be any structure located at the rear of the chipper 10 that facilitates the loading of materials to be chipped into the chipper 10. (The material to be chipped can be any material that the user desires to reduce to chips. The material is most commonly brush and tree parts, therefore, for convenience the material to be chipped will be referred to herein interchangeably as wood, trees, or brush.) In the depicted embodiment the feed chute includes a flat table portion 24 and two side walls 26, 28. It should be appreciated that many other configurations of the feed chute 16 are possible. Feed chutes are described in greater detail in a related application filed on May 10, 2007 titled WOOD CHIPPER INFEED CHUTE, which is incorporated herein by reference (No. 60/928,937).

The chipper 10 in the depicted embodiment includes an feed system 18 that grabs and pulls brush from the feed chute 16 into the body portion 20 of the chipper 10 which houses cutters 80 (see FIG. 2) that cut the brush into small chips. The cutter 80 shown has blades 82 mounted on a drum 81. However, it should be appreciated that the cutter can be any structure that is capable of breaking the material to be chipped into chips. Once the material is broken into small chips, the chips are then projected out of the chipper 10 through a discharge chute 22. Feed rollers are described in greater detail in a related application filed on May 10, 2007 titled SYSTEM FOR CONTROLLING THE POSITION OF A FEED ROLLER, which is incorporated herein by reference (No. 60/928,926). The cutter drums are described in greater detail in a related application filed on May 10, 2007 titled CHIPPER DRUM WITH INTEGRAL BLOWER which is incorporated herein by reference (No. 60/928,928). In the depicted embodiment the longitudinal axis 11 of the chipper 10 is parallel to the general direction that material to be chipped flows through the chipper 10.

Figure 2:
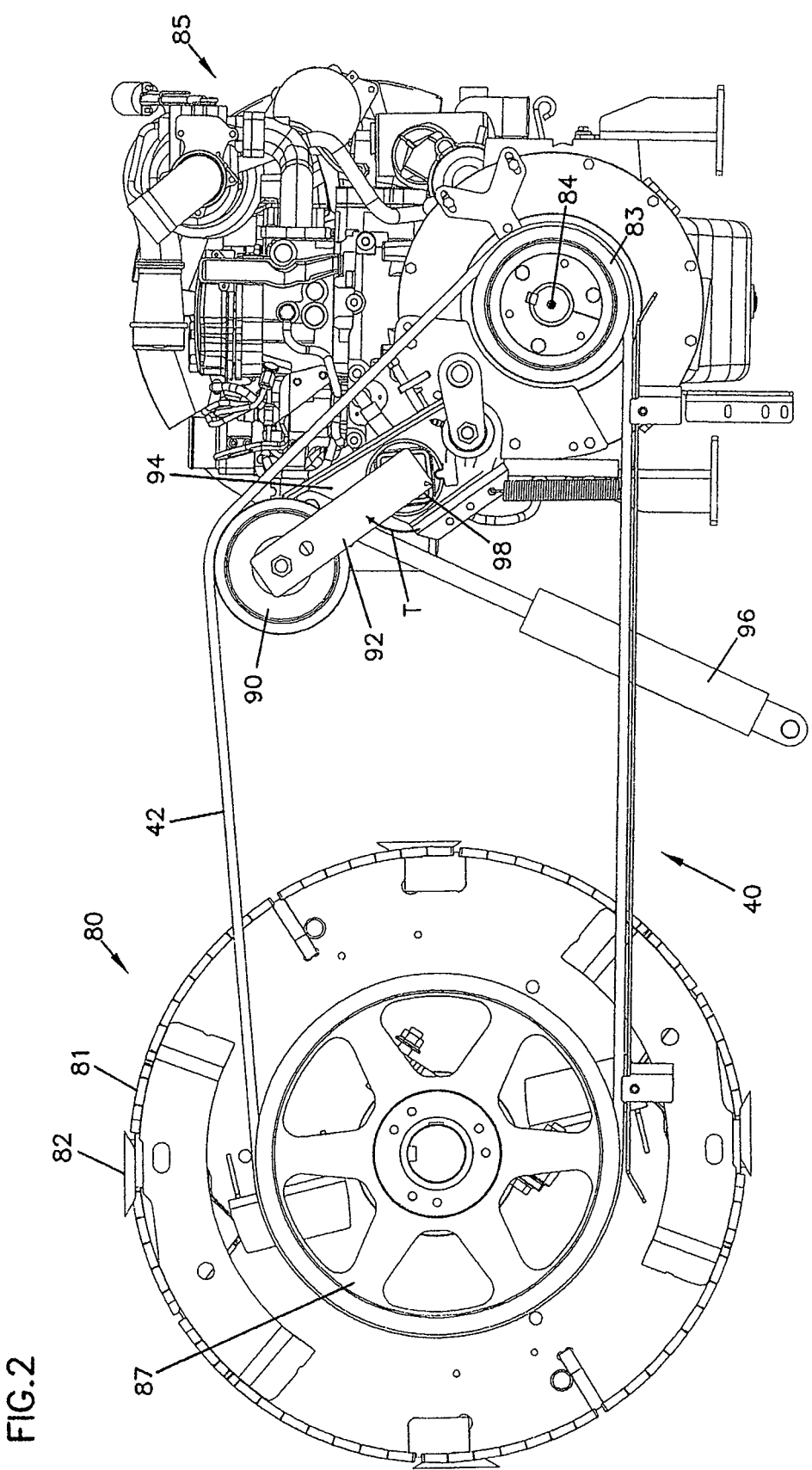
FIG. 2 is a side view of the drum, engine, and belt tension system of FIG. 1.

Referring to FIG. 2, a belt tension assembly 40 is shown. In the depicted embodiment the belt tension assembly 40 includes a belt 42 that extends around a first wheel 87 that is fixed to an end of the drum 81 such that by rotating the wheel 87 the drum 81 rotates. The belt 42 also extends around second wheel 83 attached to the output shaft 84 of the engine 85. A tensioning wheel 90 presses against the inside of the belt to apply tension to the belt 42 to enable it to frictionally engage the first wheel 87 and the second wheel 83.

The tension wheel 90 is mounted to an arm 92. The arm 92 is connected to a frame 94 that pivots relative to engine 85. The frame 94 pivots when the cylinder 96 is extended and retracted. To apply tension to the belt 42 the cylinder 96 is extended. To release the tension in the belt 42, the cylinder 96 is retracted. In the depicted embodiment, the arm 92 is connected to the frame by a torsion spring member 98. The torsion spring member 98 biases the tension wheel 90 outwardly (upwardly towards the belt) which applies tension to the belt 42. In use the cylinder 96 is extended to engage the belt 42 and preload the torsion spring member 98. In the depicted embodiment, the preloading occurs when the frame 94 is pivoted clockwise and the arm 92 is pivoted counterclockwise as a result of the extension of the cylinder 96. If the belt 42 stretches during operation, the cylinder 96 need not be extended further to compensate because the torsion spring member 98 will bias the tension wheel 90 against the belt 42. The torsion spring member 98 keeps a relatively constant tension force on the belt 42 to dampen the motion of the belt 42.

Figure 3B:
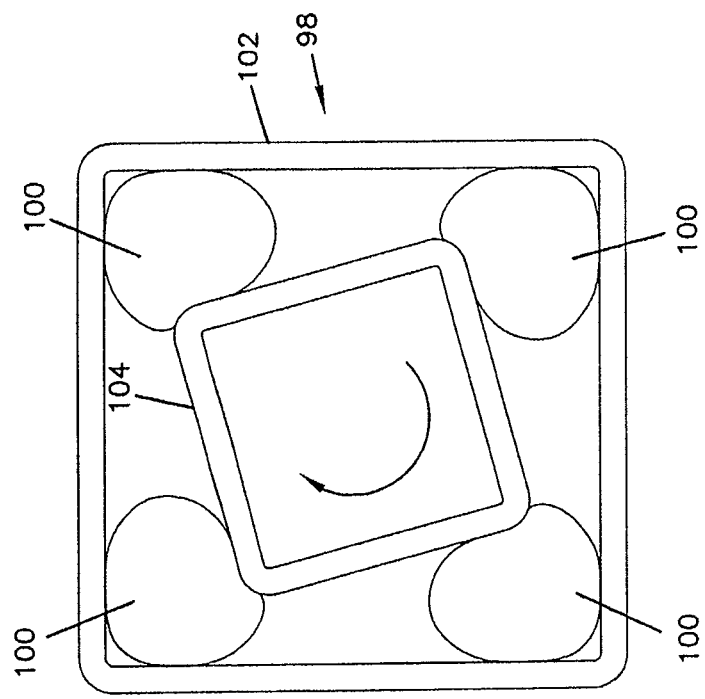
FIG. 3b is a cross-sectional view of a portion of torsion bar in a loaded position.
Figure 3A:
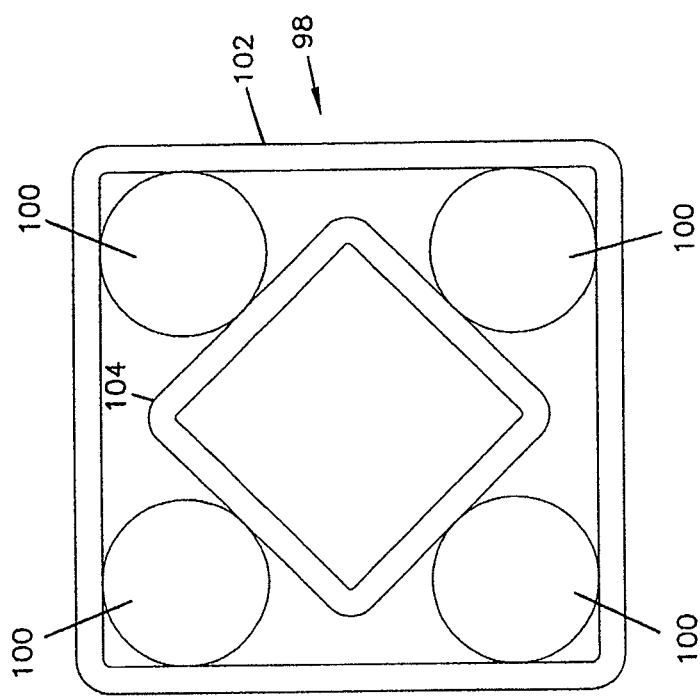
FIG. 3a is a cross-sectional view of a portion of torsion bar in an unloaded position.

Referring to FIGS. 3a and 3b, the torsion spring member (torsion bar) 98 in the depicted embodiment operates according to the rubber torsion spring principle. Four rubber inserts 100 are located in the corners of a square tube 102 and a smaller square tube 104 is located therein. From the neutral position shown in FIG. 3a the square tube 104 is designed to rotate in either the clockwise or counterclockwise direction as shown in FIG. 3b. When the square tube 104 rotates, the rubber inserts 100 deform. In the depicted embodiment the larger square tube 102 is mounted to the frame 94 which pivots, and the smaller square tube is mounted to the arm 92.

The above arrangement provides a way for applying tension to a belt 42 while the belt 42 stretches or contracts, without having to adjust the extension of the cylinder 96. The belt tension system 40 above also enables the belt 42 to be smoothly and continuously engaged and disengaged. In the depicted embodiment, there is no clutch positioned between the output shaft 84 and the wheel 83 that drives the belt 42. To bring the drum 81 up to operating speed from a stopped position, the cylinder 90 can be selectively extended and retracted to cause the belt 42 to grab and release for short periods of time. This pulsing engagement of the belt 42 can be use to gradually increase the rotational speed of the cutter 80 to avoid overloading the engine 85.

Figure 4:
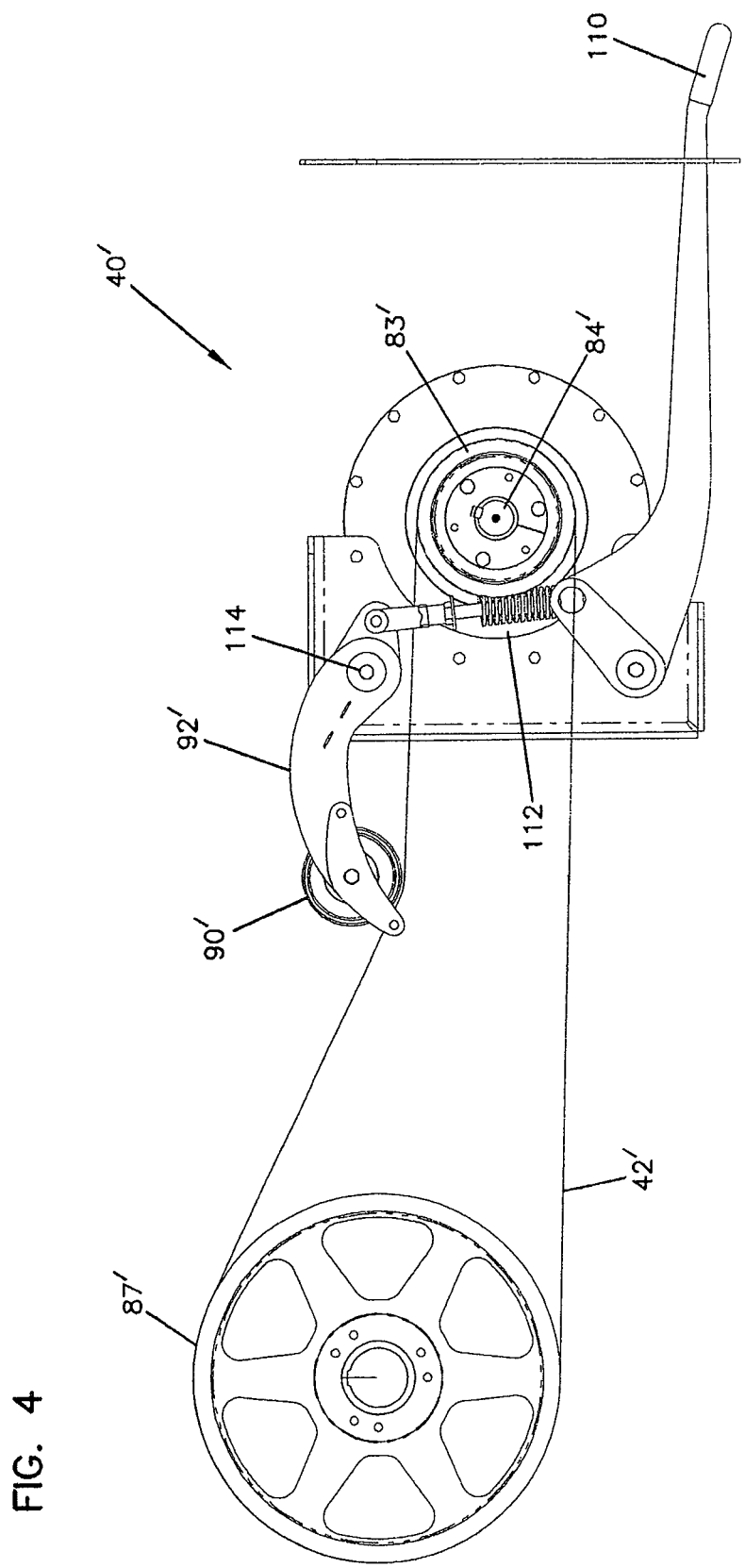
FIG. 4 is a side view of an alternative embodiment of the belt tension system of FIG. 1.
Figure 5:
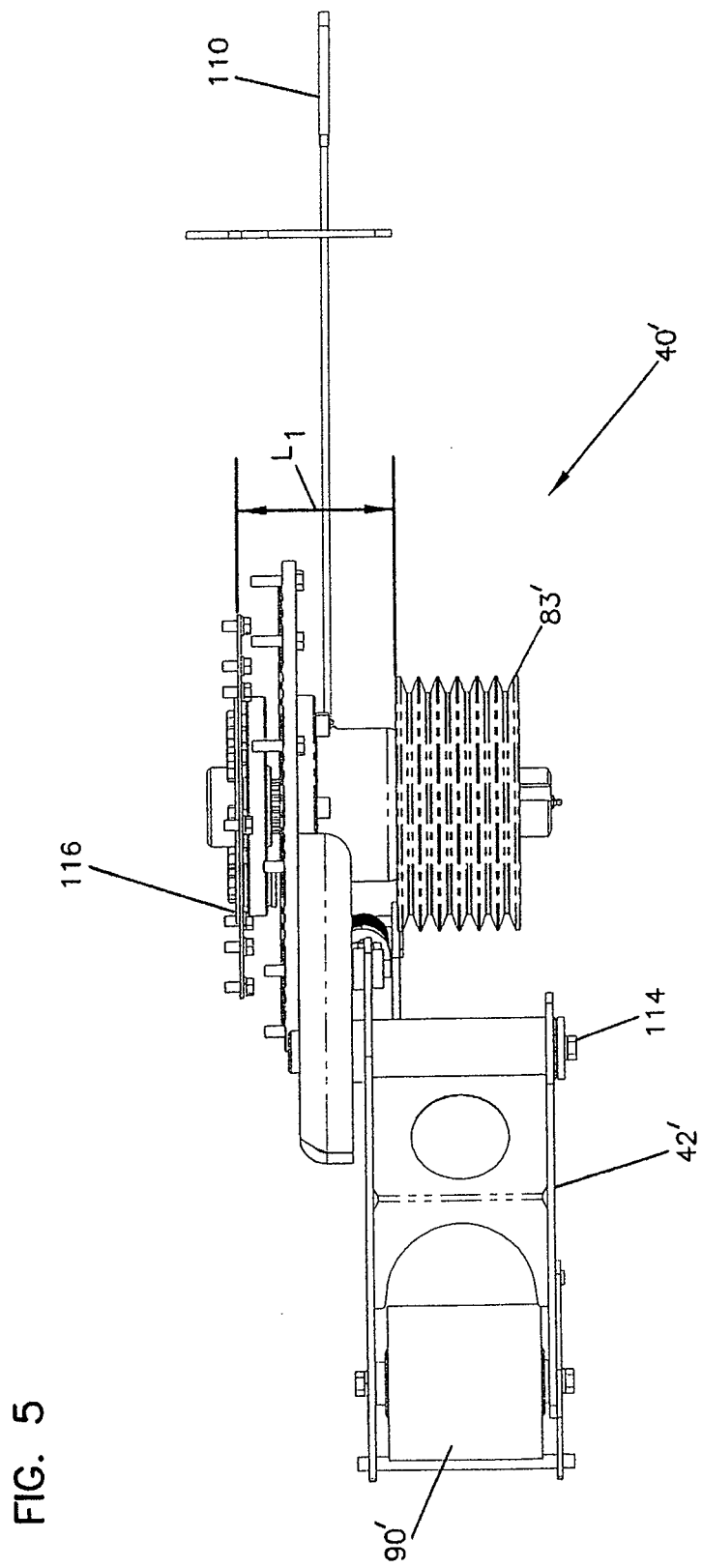
FIG. 5 is a top view of the embodiment of the belt tension system of FIG. 4.

Referring to FIGS. 4 and 5 an alternative embodiment of the belt tension system is shown. Similar to the first embodiment, the belt tension assembly 40' of the second embodiment includes a belt 42' that extends around a first wheel 87' that is fixed to an end of the drum (e.g., the drum 81 of the first embodiment) such that by rotating the wheel 87' the drum rotates. The belt 42' also extends around second wheel 83' attached to the output shaft 84' of the engine 85. In the second embodiment the tensioning wheel 90' presses against the outside rather than the inside of the belt 42' to apply tension to the belt 42'. Also, instead of using a cylinder 96 to apply the pressure a lever 110 is used to manually apply the tension to the belt 42'.

In the depicted embodiment, the tension wheel 90' is mounted to an arm 92'. The arm 92' is pivotally connected to a frame 94' at pivot 114. To apply tension to the belt 42' the lever 110 is raised. To release the tension in the belt 42', the lever 110 is lowered. A coil spring 112 is used instead of the torsion spring member 98 of the first embodiment to maintain tension in the belt 42' as the belt stretches. Though in the depicted embodiment the lever 110 is generally straight and arranged horizontally, it should be appreciated that it can be arranged in other orientations as well and can be of other geometric configurations. For example, the lever 110 could be L-shaped and/or arranged vertically. In the depicted embodiment the lever 110 is generally parallel the side of the frame 94' and perpendicular to the output shaft 84'. In some embodiment the lever 110 is positioned at an angle relative to the side of the frame 94'. The lever 110 could be, for example, within +/−30 degrees from being parallel to the frame 94' (i.e., 30 degrees from being perpendicular to the output shaft 84'). It should be appreciated that features from the first embodiment can be combined with features from the second embodiment. For example, the spring 112 could be used with the cylinder 96 instead of with the lever 110.

Referring to FIG. 5, the distance L1 from the inside edge of the second wheel 83 to the flywheel mounting plate 116 is relatively small. For example, the distance L1 on a prior art type machine that includes a clutch and an engine horsepower of 185 is typically about 16 inches. Utilizing the principles described above, the distance L1 for a chipper with an engine horsepower rating anywhere between 185 HP and 330 HP can be decreased to eight inches or less. In the depicted embodiment, the chipper includes a 215 HP engine and the distance L1 is only about six inches. Both embodiments depicted show a bearing supported stub shaft as the drive coupler to the engine, however, it should be appreciated that many other configurations are also possible. For example, an engine drive direct coupled shaft that has both an inboard and an outboard bearing could also be used.

The above arrangement provides a way for applying tension to a belt 42' while the belt 42' stretches or contracts without having to readjust the position of the lever 110. The belt tension system 40' above also enables the belt 42' to be smoothly and continuously engaged and disengaged. In the depicted embodiment, there is no clutch positioned between the output shaft 84' and the wheel 83' that drives the belt 42'. To bring the drum up to operating speed from a stopped position, the lever 110 can be selectively raised and lowered to cause the belt 42' to grab and release for short periods of time. This pulsing engagement of the belt 42' can be use to gradually increase the rotational speed of the cutter to avoid overloading the engine. Alternatively, the lever 110 can be gradually raised causing the belt 42' to transition from slipping to gripping over a longer period of time to allow the drum to gradually increase its speed.

In both depicted embodiments the engine can be mounted along the longitudinal axis of the chipper 10 so that the weight on the wheels of the chipper on the left and right sides is balanced. In the depicted embodiments the weight on the wheels on either side is within (70-30) percent and more preferably within (60-40) percent. The absence of a clutch, which is typically mounted near the output shaft of the engine, enables the weight of the engine to be distributed closer to the center of the chipper.

It should be appreciated that the belt tension systems of the invention can be used in other types of machinery as well. The use of the belt tension system in a chipper is only one potential environment for the system. The above specification, examples and data provide a complete description of the manufacture and use of the composition of the invention. Since many embodiments of the invention can be made without departing from the spirit and scope of the invention, the invention resides in the claims hereinafter appended.

We claim:

1. A direct drive chipper comprising:
   a chassis, the chassis including a longitudinal axis;

a chipper drum mounted to the chassis, the drum including a belt drive, wherein the drum drive includes an axis of rotation that is perpendicular to the longitudinal axis of the chassis;

an engine mounted to the chassis, the engine including an output shaft connected to a drive wheel, wherein the drive wheel includes a rotational axis that is perpendicular to the longitudinal axis of the chassis;

a drive belt engaged with the belt drive of the chipper drum and the drive wheel of the engine;

a tensioning assembly including:
- rocker arm that pivots relative to the engine about a pivot;
- a tension wheel mounted to the first end of the rocker arm, wherein the tension wheel includes a rotational axis that is perpendicular to the longitudinal axis of the chassis;
- a resilient linkage including a first end connected to the second end of the rocker aim to enable the rotational axis of the tension wheel to move; and
- a lever arm connected to a second end of the resilient linkage configured to rock the rocker arm thereby change the position of the tension wheel.

2. The chipper of claim 1, wherein the chipper drum is cylindrical in shape and includes a plurality of cutting blades thereon, wherein the axis of the chipper drum is perpendicular to the longitudinal axis of the chassis.

3. The chipper of claim 2, wherein the output shaft is perpendicular to the longitudinal axis of the chassis.

4. The chipper of claim 1, wherein the drum drive and drive wheel rotate from a stationary position relative to the chassis, and the tension wheel rotates from a movable position relative to the chassis.

5. The chipper of claim 1, wherein the resilient linkage includes a coil spring.

6. The chipper of claim 1, further comprising wheels positioned on the left and right sides of the chassis, wherein the weight of the chipper that is distributed on the wheels on the left side of the chassis and the wheels on the right side of the chassis is within 10 percent.

7. The chipper of claim 1, further comprising a flywheel mounting plate, wherein the distance between the flywheel mounting plate and the drive wheel is less than eight inches and the engine has a horse power rating that is greater than or equal to 185HP.

8. The chipper of claim 1, wherein the lever arm is positioned at a +/−30° angle relative to the chassis.

9. The chipper of claim 8, wherein the lever arm is positioned parallel to the chassis.

10. The chipper of claim 8, further comprising a lever arm engagement plate located adjacent a distal end portion of the lever arm that is configured to secure the lever arm at a particular orientation thereby enabling a desired amount of tension of the drive belt to be set.

11. The chipper of claim 1, wherein the pivot of the rocker arm is located between the first end and the second end of the rocker arm.

12. A direct drive chipper comprising:
- a chassis, the chassis including a longitudinal axis;
- a chipper drum mounted to the chassis, the drum including a belt drive, wherein the belt drive includes an axis of rotation that is perpendicular to the longitudinal axis of the chassis;
- an engine mounted to the chassis, the engine including an output shaft connected to a drive wheel, wherein the drive wheel includes a rotational axis that is perpendicular to the longitudinal axis of the chassis;
- a drive belt engaged with the belt drive of the chipper drum and the drive wheel of the engine; and
- a tensioning assembly including:
  - a pivot frame that pivots relative to the engine;
  - an arm mounted to the pivot frame;
  - a tension wheel mounted to the arm, wherein the tension wheel includes a rotational axis that is perpendicular to the longitudinal axis of the chassis;
  - an hydraulic cylinder connected to the pivot frame for pivoting the pivot frame thereby moving the tension wheel; and
  - a resilient member connected to the arm to enable the rotational axis of the tension wheel to move without moving the hydraulic cylinder.

13. The direct drive chipper of claim 12, wherein the resilient member is a torsion spring member.

* * * * *